US008382929B2

(12) United States Patent
Pressley

(10) Patent No.: US 8,382,929 B2
(45) Date of Patent: Feb. 26, 2013

(54) DUAL CURE ADHESIVE FORMULATIONS

(75) Inventor: Mark W. Pressley, Apex, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 13/400,774

(22) Filed: Feb. 21, 2012

(65) Prior Publication Data
US 2012/0145312 A1 Jun. 14, 2012

Related U.S. Application Data

(62) Division of application No. 11/829,470, filed on Jul. 27, 2007, now abandoned.

(60) Provisional application No. 60/820,680, filed on Jul. 28, 2006, provisional application No. 60/870,143, filed on Dec. 15, 2006.

(51) Int. Cl.
B29C 53/00 (2006.01)
B29C 53/04 (2006.01)
C08J 3/28 (2006.01)
C08F 2/46 (2006.01)

(52) U.S. Cl. ........ 156/212; 156/196; 156/213; 156/217; 264/494; 264/496; 264/446; 428/121; 428/129; 428/356; 428/355 EP; 428/343; 428/344; 428/345; 522/170; 522/134; 522/135; 522/144

(58) Field of Classification Search .................. 522/170, 522/134, 135, 142, 144, 145; 156/196, 212, 156/213, 217; 428/121, 129, 356, 355 EP, 428/343, 344, 345; 264/494, 495, 446
See application file for complete search history.

(56) References Cited

U.S. PATENT DOCUMENTS

| 4,223,115 A | 9/1980 | Zalucha et al. |
| 4,259,231 A | 3/1981 | Tomomoto et al. |
| 4,308,118 A | 12/1981 | Dudgeon |
| 4,421,879 A | 12/1983 | Eimers et al. |
| 4,452,944 A | 6/1984 | Dawdy |
| 4,467,071 A | 8/1984 | Dawdy |
| 4,536,546 A | 8/1985 | Briggs |
| 4,731,982 A | 3/1988 | Grant et al. |
| 4,769,419 A | 9/1988 | Dawdy |
| 4,773,957 A | 9/1988 | Briggs |
| 4,857,434 A | 8/1989 | Klinger |
| 5,077,360 A | 12/1991 | DePompei et al. |
| 5,252,694 A | 10/1993 | Willett et al. |
| 5,273,606 A * | 12/1993 | Greve et al. ................. 156/216 |
| 5,300,569 A | 4/1994 | Drake et al. |
| 5,340,653 A | 8/1994 | Noren et al. |
| 5,399,637 A | 3/1995 | Willett et al. |
| 5,407,784 A | 4/1995 | Berrier et al. |
| 5,641,834 A | 6/1997 | Abbey et al. |
| 5,709,948 A | 1/1998 | Perez et al. |
| 5,710,235 A | 1/1998 | Abbey et al. |
| 5,932,638 A | 8/1999 | Righettini et al. |
| 5,942,556 A | 8/1999 | Friedlander et al. |
| 5,997,682 A | 12/1999 | Goodman et al. |
| 6,057,382 A * | 5/2000 | Karim et al. ................. 522/122 |
| 6,077,601 A | 6/2000 | DeVoe et al. |
| 6,136,384 A * | 10/2000 | Karim et al. ................. 427/516 |
| 6,153,302 A * | 11/2000 | Karim et al. ................. 428/413 |
| 6,187,836 B1 | 2/2001 | Oxman et al. |
| 6,225,408 B1 | 5/2001 | Huang et al. |
| 6,231,111 B1 | 5/2001 | Carter et al. |
| 6,235,850 B1 | 5/2001 | Perez et al. |
| 6,274,643 B1 * | 8/2001 | Karim et al. ................. 522/31 |
| 6,294,249 B1 | 9/2001 | Hamer et al. |
| 6,319,344 B1 | 11/2001 | Lewno |
| 6,323,301 B1 | 11/2001 | Smith et al. |
| 6,433,091 B1 | 8/2002 | Cheng |
| 6,500,004 B2 | 12/2002 | Jensen et al. |
| 6,660,805 B1 * | 12/2003 | Righettini et al. ............ 525/65 |
| 6,734,221 B1 * | 5/2004 | Misiak ........................ 522/16 |
| 6,858,260 B2 | 2/2005 | Taylor et al. |
| 7,524,910 B2 | 4/2009 | Jiang et al. |
| 2004/0077766 A1 | 4/2004 | DeCooman et al. |
| 2006/0264573 A1 | 11/2006 | Bennett et al. |
| 2008/0249265 A1 | 10/2008 | Bischof et al. |

FOREIGN PATENT DOCUMENTS

| DE | 4437471 A1 | 4/1995 |
| DE | 19858694 A1 * | 6/2000 |
| EP | 1393705 A1 * | 3/2004 |
| GB | 2283491 A * | 5/1995 |
| JP | 2001-139643 | 5/2001 |
| SU | 960714 | 9/1982 |
| WO | 94/21455 A1 | 9/1994 |
| WO | WO 9421455 A1 * | 9/1994 |
| WO | 97/39074 | 10/1997 |
| WO | 00/37580 A1 | 6/2000 |
| WO | 01/60870 A1 | 8/2001 |
| WO | WO 0160870 A1 * | 8/2001 |
| WO | 02/47572 A1 | 6/2002 |
| WO | WO 0247572 A1 * | 6/2002 |
| WO | 2005/000915 A1 | 1/2005 |
| WO | WO 2005000915 A1 * | 1/2005 |
| WO | 2005/044875 | 5/2005 |

OTHER PUBLICATIONS

Lord Corporation, International Search Report and Written Opinion, International Application No. PCT/ US2007/074613, Date of Mailing: Jan. 23, 2008, 13 pages. Lord Corporation, China Patent Office Office Action, Chinese Patent Application No. 200680016870.1, Dated: Aug. 20, 2010, 1 page.
Lord Corporation, International Search Report and Written Opinion, International Application No. PCT/ US2006/019426, Date of Mailing: Oct. 12, 2006, 9 pages.

* cited by examiner

Primary Examiner — Sanza McClendon
(74) Attorney, Agent, or Firm — Todd W. Galinski

(57) ABSTRACT

An adhesive composition comprising as principal components, a polymerizable component, an ambient temperature radical polymerization catalyst system and a photoinitiator. The adhesive may optionally comprise an adhesion promoter, a toughener, an epoxy, and a filler material. Further, a two-part reactive adhesive comprising, a first part comprising, (i) at least one free radical-polymerizable monomer, (ii) at least one reducing agent, and (iii) a photoinitiator, and a second part comprising an oxidizing agent that is reactive at ambient temperature with the reducing agent to produce free radicals that are capable of initiating and propagating free radical polymerization.

22 Claims, No Drawings

DUAL CURE ADHESIVE FORMULATIONS

CROSS REFERENCE TO RELATED APPLICATIONS

This application is a Divisional application of U.S. Utility application Ser. No. 11/829,470, filed on Jul. 27, 2007 now abandoned, which application claims the benefit of, and incorporates by reference, U.S. Provisional Patent Application No. 60/820,680, filed Jul. 28, 2006 entitled "DUAL CURE ADHESIVE FORMULATIONS", and U.S. Provisional Patent Application No. 60/870,143, filed Dec. 15, 2006 also entitled "DUAL CURE ADHESIVE FORMULATIONS".

FIELD OF THE INVENTION

The present invention relates to adhesives containing an ambient-temperature cure system and a photoinitiator. The adhesive is cured by activation of the ambient temperature cure system, and activating the photoinitiator to cure surface portions of the adhesive.

BACKGROUND OF THE INVENTION

Redox-activated acrylic structural adhesives are well known articles of commerce which are used commercially for bonding metal to metal, and for cross bonding two dissimilar substrates materials. Acrylic structural adhesives have found growing use in the automotive industry where the adhesive bonding of metal parts is replacing welding and mechanical fastening techniques. However, these applications give rise to unique requirements not easily met by previously available adhesives. These requirements include high bond strength and improved failure mode.

Redox cured acrylic adhesives typically comprise a mixture of one or more olefinic reactive monomers such as methyl methacrylate or methacrylic acid and curing agents, with cure or polymerization being effected through an ambient temperature redox initiation mechanism employing an oxidizing agent and reducing agent. Typical reducing agents are tertiary amines. Di-substituted derivatives of aniline are disclosed in U.S. Pat. No. 4,421,879 (3,-4-disubstituted aniline). U.S. Pat. No. 5,932,638 discloses p-halogen with 3,4-disubstitution, and is shown to overcome the incidence of air inhibition.

U.S. Pat. No. 5,641,834 and U.S. Pat. No. 5,710,235, both incorporated herein by reference, disclose combinations of isocyanate capped olefinic-terminated polyalkadiene. The composition also includes a free radical-polymerizable monomer such as an olefinic monomer and, optionally, a second polymeric material. In a preferred embodiment the composition is an adhesive that also includes a phosphorus-containing compound and an ambient temperature-active redox catalyst.

Additional important features of acrylic adhesives are surface tack and open time. As used herein, "surface tack" means the amount of adhesive on an exposed surface of the applied adhesive that does not undergo curing. Such uncured adhesive can be transferred to other parts of the assembly or to the application equipment resulting in increasing clean-up costs. A common cause of surface tack is referred to as "air inhibition" since atmospheric oxygen is a powerful inhibitor of free radical reactions. Accordingly, the amount of surface tack can be measured by determining the thickness of any uncured adhesive on the surface.

In typical applications of two-part reactive adhesive systems, the two parts are mixed together, the mixed material is applied to a first substrate for bonding then a second substrate is contacted to the adhesive-applied first substrate. The time required for such mixing, applying and contacting is referred to herein as "open time".

A variety of approaches have been used in the art to overcome residual tackiness in the adhesive which has been subject to air inhibition. U.S. Pat. No. 6,294,249 discloses a pre-adhesive which is combined with a packaging material and further polymerized to form a packaged hot melt adhesive composition which is subsequently used in bonding. The adhesive comprises a) 50 to 100 parts by weight of a polymerizable component comprising at least one acrylic or methacrylic ester of a non-tertiary alkyl alcohol in which the alkyl group contains 1 to 20 (e.g., 3 to 18) carbon atoms; (b) 0 to 50 parts by weight of a polymerizable component comprising at least one modifying monomer, other than said acrylic or methacrylic ester, copolymerizable with component (a), the sum of (a) and (b) amounting to 100 parts by weight; (c) an effective amount of a polymerization initiator; and (d) an effective amount of a chain transfer agent. The polymerization initiator is preferably a photoinitiator or a thermal initiator.

U.S. Pat. No. 5,997,682 relates to a method for fabricating a structural assembly comprising the steps of providing at least two articles, each article having a surface; applying a dual-cure adhesive mixture to at least a portion of at least one of the surfaces; joining the at least two articles such that the adhesive mixture is positioned between the at least two articles; at least partially curing a first portion of the adhesive mixture by irradiating at least one of the articles with electron-beam energy such that a structural assembly is formed wherein the at least two articles are adhesively bonded together by the at least partially cured first portion of the adhesive mixture and a remaining portion remains uncured by the electron-beam energy while the first portion is curing; and allowing the remaining portion of the adhesive mixture to become cured thermally.

It would be advantageous to provide an adhesive which does not require any additional heat to initiate the cure, especially where the assembled structure is made from materials that distort under application of heat, such as most rigid thermoplastics. It would also be advantageous to avoid the use of special reducing agents to overcome problems of air inhibition, while providing a rapid elimination of surface tackiness in the adhesive which is exposed to air.

SUMMARY OF THE INVENTION

Accordingly, it is an object of an embodiment of the present invention to provide an adhesive comprising at least one free radical-polymerizable monomer, an ambient temperature radical initiator system, and a photoinitiator. In one embodiment of the present invention, the acrylic adhesive further comprises an adhesion promoter, a toughener, an epoxy, and a filler material.

In further embodiments of the present invention, the photoinitiator comprises a phosphine oxide photoinitiator, an alpha-hydroxyketone, or 2-hydroxy-2-methyl-1-phenyl-1-propanone.

In a still further embodiment of the present invention, the monomer comprises an olefinic monomer, such as at least one of tetrahydrofurfuryl methacrylate, methacrylic acid, and methyl methacrylate. In yet another embodiment of the present invention, the monomer is present in an amount from 20-70 weight percent.

In one further embodiment of the present invention, the reducing agent comprises a tertiary amine, such as formula (I):

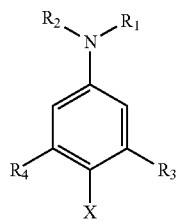

wherein each of $R_1$ and $R_2$, which may be the same or different, is independently selected from the group consisting of linear or branched, saturated or unsaturated, C1-C10 alkyl and linear or branched, saturated or unsaturated, C1-C10 hydroxyalkyl (i.e., alkyl substituted by —OH);

each of $R_3$ and $R_4$ is independently selected from the group consisting of hydrogen and linear or branched, saturated or unsaturated C1-C10 alkyl; and X is a halogen.

In alternate embodiments of the present invention, the reducing agent is selected from N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

In one embodiment of the present invention, the oxidizing agent comprises an organic peroxide. In another embodiment of the present invention, the composition further comprises an adhesion promoter, such as a phosphorous containing adhesion promoter, and the adhesion promoter comprises from 0.01 to 20 weight percent based on the total weight of the principle components.

In a still further embodiment of the present invention, the composition further comprises a toughener, such as an olefinic-terminated liquid elastomer produced from a hydroxyl-terminated polyalkadiene. In another embodiment of the present invention, the toughener comprises an A-B-A block copolymer wherein the A block is selected from styrene, ring alkylated styrene or a mixture thereof and the B block is an elastomeric segment having a low $T_g$ selected from conjugated diene or ethylene-propylene.

In yet another embodiment of the present invention, the toughener is present in an amount of about 1 to 10 weight percent, and in another embodiment the composition comprises an auxiliary toughener present in an amount from about 1 to about 15 weight percent based on the total weight of the principle components.

In a second aspect of the present invention, a two-part, reactive adhesive is provided comprising a first part comprising, at least one free radical-polymerizable monomer, at least one reducing agent, and a photoinitiator; and, a second part comprising an oxidizing agent that is reactive at ambient temperature with the reducing agent to produce free radicals that are capable of initiating and propagating free radical polymerization.

In one embodiment of the present invention, the two-part reactive adhesive further comprises an auxiliary high molecular weight toughener with a $M_w$ greater than about 18,000 or a $M_n$ greater than about 10,000. And in another embodiment of the present invention, the two-part reactive adhesive further comprises 0.1 to 20 weight percent of a phosphorous-containing compound having one or more olefinic groups.

In a third aspect of the present invention, a method of bonding together substrates to form an assembly is provided comprising:

a) contacting a substrate with an adhesive comprising a polymerizable component, an ambient temperature radical catalyst system, and a photoinitiator;

b) joining the substrates by pressing the substrates together until excess adhesive in the bond lines becomes exposed to air;

c) allowing the adhesive to develop partial or full strength by the ambient temperature radical catalyst system; and, d) subjecting the air-exposed adhesive to activating electromagnetic energy to cure the exposed adhesive portion.

In a fourth aspect of the present invention, a method for bonding together substrates to form an assembly is provided comprising;

a) applying an adhesive comprising a polymerizable component, an ambient temperature radical catalyst system, and a photoinitiator between two substrates such that the adhesive contacts both substrates and at least partially fills the area between the substrates and is at least partially exposed to air;

b) allowing the adhesive to at least partially cure through the ambient temperature radical catalyst system c) illuminating the portion of the adhesive exposed to air with activating electromagnetic energy to cure the exposed adhesive portion through the photoinitiator.

In a fifth aspect of the present invention, a method of forming a hem flange assembly is provided comprising the steps of:

(a) positioning a first panel adjacent to, but not contacting, a second panel such that an edge of the second panel extends beyond an edge of the first panel;

(b) providing an adhesive comprising a polymerizable component, an ambient temperature radical catalyst system, and a photoinitiator between the overlapping portion of the two panels;

(c) folding the non-overlapping portion of the second panel over the edge of the first panel;

(d) applying pressure to the overlapping portion of the panels so that the panels move toward each other to a point where they remain a predetermined distance apart and at least a portion of the adhesive resides in the gap between the first and second panels with a portion of the adhesive exposed to the atmosphere;

(e) allowing the ambient temperature cure to take place; and (f) curing the exposed portion of adhesive by subjecting the portion of exposed adhesive to electromagnetic energy.

In another embodiment of the present invention, prior to subjecting the exposed portion of adhesive to electromagnetic energy, the exposed surface of the adhesive is tacky, and after subjecting the exposed portion of adhesive to electromagnetic energy, the surface is tack-free.

In still another embodiment of the present invention, the adhesive is exposed to electromagnetic energy by means of a robotic arm comprising an electromagnetic energy source, and in another embodiment the adhesive is dispensed through an applicator tip mounted on a controllable robotic arm.

DETAILED DESCRIPTION OF THE INVENTION

Ambient temperature curable adhesives which are known to undergo air inhibition are treated according to an embodiment of the present invention with an effective amount of photoinitiator. Surprisingly the redox initiation system does not interfere with the photoinitiator and the adhesive exposed to air rapidly develops a localized cure with the elimination of surface. Additionally, while the formulations described herein are referred to as adhesives, they may additionally be used as coatings, sealers, and the like.

As used herein, the "principal components" of various embodiments of the present invention are at least one free radical-polymerizable monomer, an ambient temperature activated free-radical polymerization initiator comprising a redox initiation system, and a photoinitiator. The optional components include conventional and customary additives and modifiers such as adhesion promoter, plasticizer, pigment, filler, UV screener, etc.

Additionally, as used herein, the term "ambient temperature" refers to the application temperature of the adhesive or the working, environmental temperature of the area surrounding the parts to be adhered. While this will normally be in the range of 10° C. to 40° C., and preferably between 17° C. and 35° C., there may be instances where the ambient temperature is as high as 70° C. or higher, for example in the room or enclosure providing radiation to activate the photoinitiator. Primarily, the advantage of the ambient temperature curable adhesives is that they do not require a bake cycle or other purposeful energy to be applied to cure the adhesive. Other than incidental energy, for example from room heaters, lights, or heated dispensing equipment, no purposeful thermal energy is required to cure the adhesive.

Monomer

Preferred free radical-polymerizable monomers in accordance with an embodiment of the present invention comprise olefinic monomers that are characterized by the presence of a —C=C— group. Representative olefinic monomers include esters of (meth)acrylic acid such as methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate; methacrylic acid; acrylic acid; substituted (meth)acrylic acids such as itaconic acid, acrylonitrile, methacrylonitrile, acrylamide and methacrylamide; styrene; substituted styrenes such as vinyl styrene, chlorostyrene, methyl styrene and n-butyl styrene; vinyl acetate; vinylidene chloride; and butadienes such as 2,3-dichloro-1,3-butadiene and 2-chloro-1,3-butadiene. Other olefinic monomers include maleate esters; fumarate esters; and styrenic compounds such as styrene, chlorostyrene, methylstyrene, butylstyrene and vinyl styrene.

In one embodiment of the present invention, the monomer is present in an amount from 10-90 percent by weight of the principal components. In a further embodiment of the present invention, the monomer is present in an amount from 20-70 percent by weight of the principal components. In a still further embodiment of the present invention, the monomer is present in an amount from 30-60 percent by weight of the principal components Redox Initiator System In one embodiment, the adhesive contains an ambient temperature reactive redox initiator or catalyst system. The ambient temperature-reactive catalyst systems are well-known redox couple systems and need not be discussed herein in extensive detail, but they include at least one oxidizing agent and at least one reducing agent which are co-reactive at ambient temperature to generate free radicals effective to initiate addition polymerization reactions and cure the adhesive. Suitable redox (oxidation-reduction) initiators include, but are not limited to, combinations of persulfate initiators with reducing agents such as sodium metabisulfite and sodium bisulfite; systems based on organic peroxides and tertiary amines (for example, benzoyl peroxide plus dimethylaniline); and systems based on organic hydroperoxides and transition metals, for example, cumene hydroperoxide plus cobalt naphthenate.

In one embodiment of the present invention, substantially any of the known oxidizing agents may be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride.

Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine (DIIPT), dimethyl aniline, p-halogenated aniline derivatives and dimethyl-p-toluidine; and aminealdehyde condensation products, for example, the condensation products of aliphatic aldehydes such as butyraldehyde with primary amines such as aniline or butylamine. Preferred reducing agents are p-halogenated aniline derivatives having the formula (I):

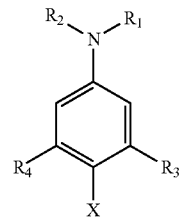

wherein each of $R_1$ and $R_2$, which may be the same or different, is independently selected from the group consisting of linear or branched, saturated or unsaturated, C1-C10 alkyl and linear or branched, saturated or unsaturated, C1-C10 hydroxyalkyl (i.e., alkyl substituted by —OH); each of $R_3$ and $R_4$ is independently selected from the group consisting of hydrogen and linear or branched, saturated or unsaturated C1-C10 alkyl; and X is halogen.

In a preferred embodiment of formula (I), each of $R_1$ and $R_2$ is independently selected from the group consisting of C1-C4 alkyl and C1-C4 hydroxyalkyl, and more preferably each of $R_1$ and $R_2$ are the same and are methyl or isopropanol; each of $R_3$ and $R_4$ is hydrogen; and X is fluorine, chlorine, bromine, or iodine, and more preferably chlorine or bromine. Exemplary reducing agents include, but are not limited to, N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

Tertiary amines which are suitable reducing agents include those having the formula:

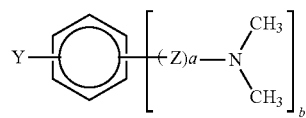

wherein Z is methylene; Y is selected from the group consisting of hydrogen, hydroxy, amino, $C_1$ to $C_8$ alkyl, preferably $C_1$ to $C_4$ alkyl, and $C_1$ to $C_8$ alkoxy, preferably $C_1$ to $C_4$ alkoxy, a is zero or 1; and b is 1 or 2. This tertiary amine is advantageous in accelerating the cure of adhesive embodiments containing a unsaturated organophosphorus compounds described above. Especially preferred tertiary amines in this context are N,N-dimethyl aniline and N,N-dimethylaminomethylphenol. The use of known accelerators and promoters with the redox couple catalyst systems can be advantageous. For example, dimethylaminomethyl phenols or organic salts of transition metals such as copper or cobalt napthlenate may be employed.

Preferably, the oxidizing agent will be present in an amount in the range from about 0.5 to about 50 percent by weight of polymerizable adhesive composition, with the amount of reducing agent being in the range from about 0.05 to about 10 preferably about 0.1 to about 6, percent by weight of polymerizable adhesive composition.

Photoinitiator

Photosensitizers or photoinitiators may further promote the reactivity of the olefinically unsaturated species. Useful photoinitiators employed as the photoinitiator activated radical curing system are known in the art. Suitable examples include acetophenones such as benzyl dimethyl ketal and 1-hydroxycyclohexyl phenyl ketone, substituted alpha-ketols such as 2-methyl-2-hydroxypropiophenone, benzoin ethers such as benzoin methyl ether, benzoin isopropyl ether, substituted benzoin ethers such as anisoin methyl ether, aromatic sulfonyl chlorides, photoactive oximes, thioxanthone-based photoinitators such as a blend of 2-isopropyl and 4-isopropyl thioxanthone, and phosphine oxide photoinitiators such as 2,4,6-Trimethylbenzoyldiphenylphosphine oxide. In one embodiment of the present invention, the preferred photoinitiators comprises alpha-hydroxyketone initiators.

Representative photoinitiators include 2-hydroxy-2-methyl-1-phenylpropan-1-one, 1-hydroxy-cyclohexyl-phenyl ketone, 2-benzyl-2-dimethylamino-1-(4-morpholinophenyl)-butanone-1,2,2 dimethoxy-1,2 diphenyl ethan-1-one, 1-[4-(2-hydroxyethoxy)-phenyl]-2-hydroxy-2-methyll-1-propane-1-one, and mixtures thereof.

In one embodiment of the present invention, the photoinitiator is used in an amount from about 0.001 to about 10.0 parts by weight per 100 parts of total monomer, preferably from about 0.01 to about 5.0 parts by weight per 100 parts of total monomer.

The photoinitiator is selected depending upon a number of factors including compatibility with the other constituents of the adhesive formulation and the desired wavelength of activating radiation. In a preferred embodiment of the present invention, the photoinitiator is selected such that activating radiation comprises any wavelength of from 4 to 1000 nanometers including near ultraviolet and far or vacuum ultraviolet radiation; visible radiation; and near infrared radiation. In an even more preferred embodiment the activating radiation comprises a wavelength of from about 10 to about 400 nanometers; and in another preferred embodiment of the present invention about 400 to about 700 nanometers. In a still further embodiment of the present invention, the radiation will be incoherent, pulsed ultraviolet radiation from a dielectric barrier discharge excimer lamp or radiation from a mercury lamp.

Toughener

Optionally, a toughener polymer can be used at from about 0 to 80 percent, and more preferably 2-50 percent, by weight of the principal components. An exemplary low molecular weight toughener has a weight average molecular weight ($M_w$) of less than about 18,000 or a number average molecular weight ($M_n$) of less than about 10,000. The toughener polymer material may or may not include an olefinically unsaturated structure that is capable of being polymerized per se or copolymerized with at least one of the free radical polymerizable monomers described above. The polymeric material can be for example, various solid and liquid elastomeric polymeric materials, and in particular liquid olefinic-terminated elastomers as described in U.S. Pat. Nos. 4,223,115; 4,452,944; 4,769,419; 5,641,834 and 5,710,235; and olefinic urethane reaction products of an isocyanate-functional prepolymer and a hydroxy functional monomer, as described in U.S. Pat. Nos. 4,223,115; 4,452,944; 4,467,071 and 4,769,419, the entire disclosure of each which is hereby incorporated by reference.

Representative liquid olefinic-terminated elastomers disclosed in P.C.T. Publication WO 97/39074 include homopolymers of butadiene, copolymers of butadiene and at least one monomer copolymerizable therewith, for example, styrene, acrylonitrile, methacrylonitrile (e.g. poly(butadiene-(meth)acrylonitrile or poly(butadiene-(meth)acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers). The preferred toughener polymer is an olefinic-terminated liquid elastomer produced from a hydroxyl-terminated polyalkadiene as described in the '834 patent. Other exemplary toughener polymers are urethane modified olefinic-terminated liquid elastomer produced from a carboxylic acid-terminated alkadiene as described in the '419 patent.

Also useful are tougheners such as styrene-isoprene-styrene A-B-A block copolymer. Typical configurations include linear triblock, radial, branched and tapered geometries. The A block is rigid at the service temperature while the B block is usually elastomeric at the service temperatures. Useful copolymers include those in which the A block is polystyrene, α-methyl styrene, t-butyl styrene, and other ring alkylated styrenes as well as mixtures of some of all of the above B is an elastomeric conjugated diene, i.e., isoprene, having an average molecular weight of from about 5,000 to about 500,000.

In a further embodiment of the present invention, a supplemental toughener is used in conjunction with a primary toughener. The supplemental toughener polymer can be included at a typical level of preferably 1-15 percent by weight of the principal components, and more preferably about 1-10 percent by weight of the principle components. An exemplary supplemental tougher polymer is a polymer having $M_w$ of greater than about 18,000 or a $M_n$ greater than about 10,000. Other tougheners usable in an embodiment of the present invention include, for example, block copolymers and random copolymers including but not limited to polyethylene, polypropylene, styrene-butadiene, polychloroprene, EPDM, chlorinated rubber, butyl rubber, styrene/butadiene/acrylonitrile rubber and chlorosulfonated polyethylene.

Adhesion Promoters

A further embodiment of the present invention further comprises an adhesion promoter. An adhesion promoter in accordance with an embodiment of the present invention comprises any adhesion promoter known to those of ordinary skill in the art as useful in promoting adhesion in acrylic adhesives. Preferred adhesion promoters in accordance with an embodiment of the present invention are phosphorus-containing compounds that enhance metal adhesion and may be any derivative of phosphinic acid, phosphonic acid or phosphoric acid having at least one P—OH group and at least one organic moiety characterized by the presence of an olefinic group, which is preferably terminally located. A listing of such phosphorus compounds is found in U.S. Pat. No. 4,223,115.

Phosphorus-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, phosphoric acid; 2-methacryloyloxyethyl phosphate; bis-(2-methacryloxyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; vinyl phosphonic acid; cyclohexene-3-phosphonic acid; alphahydroxybutene-2 phosphonic acid; 1-hydroxy-1-phenyl-methane-1,1-diphosphonic acid; 1-hydroxy-1-methyl-1-disphosphonic acid: 1-amino-1 phenyl-1,1-diphosphonic acid; 3-amino-1-hydroxypropane-1,1-disphosphonic acid; amino-tris (methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid. A most preferred adhesion promoter is 2-hydroxyethyl-methacrylate phosphate.

An additional group of phosphorus-containing compounds suitable for use as an adhesion promoter comprise those having the formula:

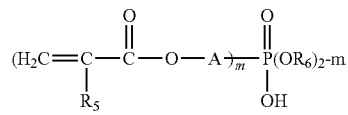

wherein $R_5$ is selected from the group consisting of H, $C_1$ to $C_8$, preferably $C_1$ to $C_4$, alkyl, and $H_2C=CH—$; $R_6$ is selected from the group consisting of H, $C_1$ to $C_8$, preferably $C_1$ to $C_4$, alkyl; A is selected from the group consisting of $—R_7O—$ and $(R_8O)_n$, wherein $R_7$ is an aliphatic or cycloaliphatic $C_1$ to $C_9$, preferably $C_2$ to $C_6$, alkylene group; $R_8$ is $C_1$ to $C_7$ alkylene, preferably $C_2$ to $C_4$ alkylene group; n is an integer from 2 to 10 and m is 1 or 2, preferably 1.

Adhesion promoters can be present in the compositions of an embodiment of the present invention in amounts from about 0.01 to about 20, preferably about 2 to about 10, percent by weight, based on the total weight of the adhesive composition.

Epoxy Compound

In a further embodiment of the present invention, the composition optionally comprises an epoxy component. In one embodiment of the present invention, the epoxy component comprises a hardenable, epoxy functional compound (liquid resin) that contains statistically more than one oxirane ring per molecule (polyepoxide). The preferred epoxy-functional material contains two epoxy groups per molecule. A monofunctional epoxy compound can also be combined with the polyepoxide component as a viscosity modifier that acts as a reactive diluent. Epoxy resins suitable for use herein include polyglycidyl ethers of polyhydric alcohols, and polyglycidyl esters of polycarboxylic acids. Polyglycidal esters can be obtained by reacting an epihalohydrin, such as epichlorohydrin or epibromohydrin, with a aliphatic or aromatic polycarboxylic acid such as oxalic acid, succinic acid, glutaric acid, terephthalic acid, 2,6-naphthalene dicarboxylic acid, and dimerized linoleic acid. The polyglycidal ethers of aromatic polyols are preferred and are prepared by reacting epihalohydrin with a polyhydroxy phenol compound in the presence of an alkali. Suitable starting polyhydroxy phenols include resorcinol, catechol, hydroquinone, bis(4-hydroxyphenyl)-2,2-propane also known as bisphenol A, bis(4-hydroxyphenyl)-1,1-isobutane, 4,4-dihydroxybenzophenone, bis(4-hydroxyphenol)-1,1-ethane, bis(2-hydroxyphenyl)-methane, and 1,5-hydroxynaphthalene, and the diglycidyl ether of bisphenol A.

In one embodiment of the present invention, the epoxy component comprises from 2 weight percent to 15 weight percent, preferably from 6 weight percent to 13 weight percent, based on the total weight of the adhesive composition.

Application Packages

Although the adhesive of the various embodiments of present invention may take many packaged forms, one being a multipack or two-part adhesive system where one package or part contains the polymerizable or reactive components and the reducing agent and a second package or part contains the oxidizing agent. The photoinitiator may be included with either package; however in a preferred embodiment of the present invention, the photoinitiator is included with the reducing agent. The two part adhesive system may optionally include rheology modifiers, waxes, stabilizers, and fillers as is known in the art.

The two parts are mixed together at the time of use in order to initiate the reactive cure. After mixing the individual packages, one or both surfaces to be joined are coated with the mixed adhesive system and the surfaces are placed in contact with each other. The second package can include a bonding activator that includes the oxidizing agent for the redox catalyst system, and optionally an epoxy compound, an adhesion promoter, and fillers. The bonding activator comprises:
  (1) from about 0.5 to about 50 percent by weight based on total weight of bonding activator of at least one oxidizing agent which can function as an oxidant of a redox couple catalyst system; and
  (2) from about 30 to about 99.5 percent by weight, based on total weight of bonding activator, of a carrier vehicle.

The carrier vehicles which are suitable for use in the bonding activators can be a simple inert solvent or diluent such as methylene chloride, or butyl benzyl phthalate, including mixtures of such solvents or diluents. The carrier vehicle should contain no more than about 5.0 percent by weight of any moiety which is reactive with the oxidizing agent at ambient temperature. The carrier vehicle can be a more complex mixture including at least one film-forming binder in addition to inert solvent or diluent. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

An exemplary two part system includes:
  (I) a first package comprising
  (a) 10-90, preferably 20-70, weight percent of an olefinic monomer selected from the group consisting of (meth) acrylic acid; esters, amides or nitriles of (meth)acrylic acid; maleate esters; fumerate esters; vinyl esters; conjugated dienes; itaconic acid; styrenic compounds; and vinylidene halides;
(b) 0.05-10, preferably 0.1-6, weight percent of at least one reducing agent which is interactive with an oxidizing agent to produce free radicals which are capable of initiating and propagating free radical polymerization reactions;
(c) 0.001 to about 10.0, preferably 0.01 to about 5.0, parts by weight per 100 parts total monomer of a photoinitiator,
(d) 10-80, preferably 20-50, weight percent of the primary toughener;
(e) optionally 1-15, preferably 1-10, weight percent of the auxiliary toughener;
(f) optionally 0.01-20, preferably 2-10, weight percent of a phosphorus-containing compound having one or more olefinic groups; and
(II) a second package comprising
a bonding activator containing an oxidizing agent of an ambient temperature-active redox couple catalyst system, the oxidizing agent being reactive at ambient temperature with agent (b) when the first and second packages are mixed to produce free radicals which are capable of initiating and propagating free radical polymerization, the amount of the oxidizing agent being sufficient to interact with agent (b),
wherein the weight percents are based on the total amount of the principal components.

Applications

The adhesive systems may be used to bond metal surfaces, such as steel, aluminum and copper, to a variety of substrates, including metal, plastics, and other polymers, reinforced plastics, fibers, glass, ceramics, wood and the like. It is a feature of an embodiment of the present invention that the herein-described adhesive compositions can be employed to bond metal substrates such as steel, aluminum and copper with little, if any, pretreatment of the metal surface prior to application of the adhesive. Additionally, the adhesive systems of an embodiment of the present invention provide effective bonding at ambient temperature, thus heat is not required either for applying the adhesive systems to the substrates or for curing.

Although the adhesives of an embodiment of the present invention are preferred for bonding metal surfaces, the present adhesive compositions may be applied as an adhesive, primer or coating to any surface or substrate capable of receiving the adhesive. The metals which are preferred for bonding with the present adhesives include zinc, copper, cadmium, iron, tin, aluminum, silver, chromium, alloys of such metals, and metallic coatings or platings of such metals such as galvanized steel including hot dipped, electrogalvanized steel and galvanealed steel.

The adhesive coatings may be brushed, rolled, sprayed, dotted, knifed or otherwise applied to one substrate, but preferably to both substrates to desired thickness preferably not to exceed 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition there between. The adhesive should have a thickness less than 60 mils for optimum results. The smoothness of the surfaces and their clearance (e.g., in the case of nuts and bolts) will determine the required film thickness for optimum bonding. The two metal surfaces and the interposed adhesive composition are maintained in engagement until the said adhesive composition has cured sufficiently to bond the said surfaces.

As discussed herein, the adhesive formulations of the various embodiments of the present invention may be employed in a variety of applications. In the preferred application as an over hem sealer, the polymeric material is applied over the cut edge of a hem flange joint after the joint is closed (hemmed). Its primary purpose is to protect the joint from corrosion and to provide an appealing cosmetic finish to the assembly.

As discussed above, the adhesive cures via free-radical polymerization, but oxygen inhibition of this chemistry prevents adequate cure of the surface of the adhesive bead resulting in a thin, tacky, partially cured layer. A photoinitiator contained in the adhesive formulation allows for surface cure (resulting in a paintable, non-tacky surface) after exposure to the appropriate amount and type of electromagnetic radiation. Thus, use of the adhesive requires an application step and a radiation exposure step. The photoinitiated cure may be performed simultaneously with or subsequent to the ambient temperature cure. As will be appreciated by those skilled in the art, the ambient temperature cure will initiate as soon as the two parts of the adhesive system are mixed, but due to the rate of cure could be several hours before the adhesive has reached the desired strength.

Application and photoinitiated surface cure of this adhesive could be accomplished in a variety of ways. Some non-limiting examples follow.

In a first aspect of the application of the adhesive of the embodiments of the present invention, the two components of the adhesive composition are pumped from bulk containers to a metering unit. The metering unit can consist of gear pumps, positive displacement rod meters, or any other method of ensuring that the ratio of the output volumetric flow rate of the two components is correct prior to entering the mixing head. Mixing can be performed by combining the metered components through a static mixer, or in a dynamic mixer. The resulting mixed material is then extruded through an applicator tip onto the part, directly over the seam. It is desirable to have the mixing head close to the point of application because, once mixed, the adhesive has a limited open time; purging of mixed adhesive between applications may be required if flow rates are not high enough to prevent gelation of the adhesive in the mixing head.

In another embodiment of the present invention, the applicator tip, and/or the mix head can be mounted on a robot to help ensure (1) a smooth application pattern, (2) a reproducible pattern, and (3) coupled with flow rate control, the robot speed can dictate the dimensions of the adhesive bead. The process described robotically could also be performed manually if aesthetics and reproducibility of shape are not essential.

Once the adhesive bead is applied to the part or parts to be adhered, the outer layer must be surface cured with an electromagnetic radiation source. As in the application of the adhesive, there are a variety of methods to effect a surface cure of the applied adhesive.

In a first exemplary embodiment of the present invention, the part with applied adhesive bead is moved into an enclosed space that provides those outside the space shielding from electromagnetic radiation. The part is then placed by the robot over, under, alongside, etc a bank of lights. Exposure time is dependent on the amount of electromagnetic energy focused at the adhesive bead when the part is a particular distance away from the light source. In most cases, this is only a few seconds of exposure. Depending on how the lights are powered, the lights may stay on continuously, or, if using microwave powered or other "instant on" light sources, they may be switched on only when a part is present, and only for the desired exposure time.

In another exemplary embodiment of the present invention, the part with applied adhesive bead is moved into an enclosed space that provides those outside the space shielding from electromagnetic radiation. A robot having an end affecter equipped with an electromagnetic radiation source passes the source over the uncured adhesive bead at the correct distance and speed to cure the surface of the bead. The robot may be the same robot that applied the adhesive, just using a different end-affecter.

In a still further exemplary embodiment of the present invention, the entire work cell itself is shielded, and then an electromagnetic radiation source may be adapted directly behind the dispensing nozzle so that the adhesive is surface cured immediately as it is being applied to the part. Depending on the cure kinetics of the adhesive, there may be an optimal time during the curing process of the bulk adhesive to cure the surface.

The following examples are provided for illustration purposes only and are not intended to limit the scope of the invention in any manner.

Example 1

The following masterbatch was prepared:

A-side

| Raw Material Description | Amount (wt. %) |
|---|---|
| Monomer 1 | 33.79 |
| Monomer 2 | 2.4 |
| Tertiary amine initiator | 1.4 |
| Photoinitiator | X % (see below) |
| Adhesion promoter | 3.0 |
| Rheology modifier | 5.4 |
| Stabilizer | 0.01 |
| Rubber toughener | 34.5 |
| Filler | 16.3 |
| Wax | 1.2 |
| Total | ~100.0 |

B-side

| Raw Material Description | Amount (wt. %) |
|---|---|
| Epoxy resin | 50.7 |
| Benzoyl peroxide (BPO) source | 7.7 |
| Rheology modifier | 1.0 |
| Filler | 40.6 |
| Total | 100.0 |

This adhesive was mixed in a 4:1 ratio by volume and dispensed in a bead configuration (¼" wide×⅛" thick×3" long) onto an aluminum substrate and passed through a UV cure unit at various energy levels. Samples were observed for a tack-free surface immediately after exposure to UV radiation and 24 hours after exposure. Photoinitiator levels given in the following table are a percentage of the adhesive after the two sides A and B were mixed.

| Photoinitiator | PI level (wt %) | UV energy (mJ/cm$^2$) | Initial tack | 24 hr. tack |
|---|---|---|---|---|
| None (control) | 0 | 723 | tacky | tacky |
| | | 1012 | tacky | tacky |
| Photoinitiator A[1] | 2.0 | 701 | tack free | tack free |
| | | 424 | tack free | tack free |
| | | 357 | tack free | tack free |
| | | 329 | slight tack | tack free |
| | | 301 | slight tack | tack free |
| | 1.0 | 684 | tack free | tack free |
| | | 446 | tack free | tack free |
| | | 361 | tack free | tack free |
| | | 303 | slight tack | tack free |
| | 0.5 | 732 | tack free | tack free |
| | | 437 | slight tack | tack free |
| | | 358 | tacky-slight cure | tack free |
| | | 310 | no cure | slight tack |
| | 0.1 | 1545 | tack free | tack free |
| | | 1128 | slight tack | tack free |
| | | 732 | slight tack | tack free |
| | | 647 | slight tack | tack free |
| | | 424 | no cure | slight tack |
| Photoinitiator B[2] | 2.0 | 668 | tack free | tack free |
| | | 518 | tack free | tack free |
| | | 401 | slight tack | tack free |
| | | 339 | slight tack | tack free |
| | | 290 | tacky | tack free |
| | 1.0 | 667 | tack free | tack free |
| | | 499 | slight tack | tack free |
| | | 407 | tacky | tack free |
| | 0.5 | 1529 | tack free | tacky |
| | | 1418 | tack free | tacky |
| | | 1041 | slight tack | slight tack |
| | | 676 | slight tack | slight tack |
| | 0.1 | 2140 | slight tack | tacky |
| | | 1572 | slight tack | slight tack |
| | | 1450 | slight tack | slight tack |
| | | 1047 | slight tack | slight tack |
| | | 685 | tacky | tack free |

[1]Photoinitiator A comprises a 50/50 wt % mixture of 1-hydroxy-cyclohexyl-phenyl-ketone and benxophenone.
[2]Photoinitiator B comprises 2-hydroxy-2-methyl-1-phenyl-propanone.

Example 2

A bead of the above masterbatch with 1 percent Photoinitiator B added to the A-side was applied to a substrate and was cured for 24 hours at ambient temperature. The cured adhesive, which had a thin film of uncured adhesive at the surface, was exposed to 600 mj/cm$^2$ of UV radiation. The surface was rendered tack-free. The sample was then painted. After the paint had completely cured, a crosshatch adhesion test was performed according to ASTM F 1842-02, and the resulting adhesion was excellent.

Example 3

The following photoinitiators were added at 2 and 4-weight percent to the A-side of the above masterbatch and were mixed thoroughly.
1. No photoinitiator
2. Photoinitiator C (blend of 2-isopropyl and 4-isopropyl thioxanthone)
3. Photoinitiator D (2,4,6-Trimethylbenzoyldiphenylphosphine oxide)

Each of these materials was mixed at 4:1 by volume with the above masterbatch B-Side and dispended into a 0.25" wide bead and allowed to cure at ambient temperature for 60 minutes. After cure, the surfaces of all samples were tacky. All samples were then exposed to UV light at an intensity of 2000 mJ/cm2. The surfaces of both samples of #2 and #3 were tack-free, while the surface of #1 remained tacky.

Example 4

The following formulation was prepared comprising an alternate redox initiator system.

| Raw Material Description | Amount |
|---|---|
| GMA/CTB liquid rubber | 100 g |
| Methyl methacrylate | 88 g |
| Methacrylic acid | 10 g |
| Cumene hydroperoxide | 1 part per hundred (based on total solution) |
| p-toluenesulfonyl chloride | 30 mmoles/100 g rubber |

To this formulation, Photoinitiator E (a 50/50 weight percent mixture of Diphenyl (2,4,6-trimethylbenzoyl)-phosphine oxide and 2-hydroxy-2-methyl-1-phenyl-propanone) was added at 0, 2, and 4 weight percent. These mixtures were combined with a B-Side comprising a condensation product of butyraldehyde and aniline at 10:1 by weight and were allowed to cure at ambient temperature for 60 minutes. All samples had a very tacky surface after curing. All samples were then exposed to UV light at an intensity of 2000 mJ/cm2. The surfaces of both samples containing Photoinitiator E were tack-free, while the surface of the sample without a photoinitiator remained tacky.

Example 5a

The following masterbatch was prepared, mixed, then applied and cured as in Example 1. Results are as follows:

| A-side | |
|---|---|
| Raw Material Description | Amount (wt. %) |
| Monomer | 8.8 |
| Tertiary amine initiator | 1.6 |
| Photoinitiator | 1.0 |
| Adhesion promoter | 4.5 |
| Rheology modifier | 4.0 |
| Stabilizer | 0.01 |
| Rubber toughener | 61.2 |
| Filler | 18.89 |
| Total | 100.0 |

| B-side | |
|---|---|
| Raw Material Description | Amount (wt. %) |
| Epoxy resin | 48.0 |
| BPO source | 11.0 |
| Rheology modifier | 2.9 |
| Rubber toughener | 8.1 |
| Filler | 30.0 |
| Total | 100.0 |

| Photoinitiator | PI level (wt %) | UV energy (mJ/cm$^2$) | Initial tack | 24 hr. tack |
|---|---|---|---|---|
| None (control) | 0 | 2000 | tacky | tacky |
| | | 3000 | tacky | tacky |
| Photoinitiator A[1] | 1.0 | 1008 | slight tack | very slight tack |
| | | 1400 | slight tack | very slight tack |
| | | 1936 | very slight tack | tack free |
| | | 2448 | tack free | tack free |
| | 1.0 | 1000 | slight tack | very slight tack |
| | | 2000 | very slight tack | tack free |
| | | 3000 | tack free | tack free |
| | 0.5 | 1000 | slight tack | very slight tack |
| | | 2000 | very slight tack | tack free |
| | | 3000 | tack free | tack free |
| Photoinitiator C[2] | 2.0 | 1000 | tacky | tacky |
| | | 2000 | slight tack | slight tack |
| | 1.0 | 1000 | slight tack | slight tack |
| | | 2000 | tack free | tack free |

[1] Photoinitiator A comprises a 50/50 wt % mixture of 1-hydroxy-cyclohexyl-phenyl-ketone and benzophenone.
[2] Photoinitiator C comprises a 50/50 wt % mixture of diphenyl-2,4,6-trimethylbenzoyl phosphine oxide and 2-hydroxy-2-methyl-1-phenyl-propan-1-one.

Example 5b

The masterbatch below was prepared with the addition of a wax component, mixed, applied as in Example 1.

| A-side | |
|---|---|
| Raw Material Description | Amount (wt. %) |
| Monomer | 8.8 |
| Tertiary amine initiator | 1.6 |
| Photoinitiator | 1.0 |
| Adhesion promoter | 4.5 |
| Rheology modifier | 4.0 |
| Stabilizer | 0.01 |
| Rubber toughener | 61.2 |
| Filler | 14.89 |
| Wax | 4.0 |
| Total | 100.0 |

| B-side | |
|---|---|
| Raw Material Description | Amount (wt. %) |
| Epoxy resin | 50.7 |
| BPO source | 7.7 |

-continued

| B-side | |
|---|---|
| Raw Material Description | Amount (wt. %) |
| Rheology modifier | 1.0 |
| Filler | 40.6 |
| Total | 100.0 |

The adhesive was cured at 1000 and 2000 mJ/cm$^2$. The adhesive including wax and a photoinitiator showed no initial tack and no tack after 24 hours.

What is claimed is:

1. A method of forming a hem flange assembly, comprising the steps of:
    (a) positioning a first panel adjacent to a second panel such that an edge of the second panel extends beyond an edge of the first panel;
    (b) folding the non-overlapping portion of the second panel over the edge of the first panel to form a hem flange joint;
    (c) applying an over hem sealer to cover the hem flange joint, the over hem sealer comprising:
        (i) at least one free-radical polymerizable monomer;
        (ii) an ambient temperature radical initiator system comprising at least one oxidizing agent and at least one reducing agent;
        (iii) a photoinitiator; and,
        (iv) an epoxy compound; wherein the adhesive will at least partially cure at a temperature between 10° C. and 40° C. through the ambient temperature radical catalyst system;
    (d) allowing the ambient temperature cure to take place, wherein at least a portion of the surface of the sealer remains uncured and slightly tacky; and
    (e) curing the surface of the sealer by exposing the surface to electromagnetic energy to activate the photoinitiator.

2. The method of claim 1, wherein after exposing the surface to electromagnetic energy, the surface is tack-free.

3. The method of claim 1, wherein the surface is exposed to electromagnetic energy by means of a robotic arm comprising an electromagnetic energy source.

4. The method of claim 1, wherein the sealer is dispensed through an applicator tip mounted on a controllable robotic arm.

5. The method of claim 1, wherein the over hem sealer is applied to a bare metal hem flange joint.

6. The method of claim 5, further comprising (g) painting over the cured over hem sealer to provide a painted hem flange assembly.

7. The method of claim 1, wherein the electromagnetic energy comprises visible light.

8. The method of claim 1, wherein the photoinitiator comprises a phosphine oxide photoinitiator.

9. The method of claim 1, wherein the photoinitiator comprises 2,4,6-trimethylbenzoyldiphenylphosphine.

10. The method of claim 1, wherein the photoinitiator comprises an alpha-hydroxyketone.

11. The method of claim 1, wherein the photoinitiator comprises 2-hydroxy-2-methyl-1-phenyl-1-propanone.

12. The method of claim 1, wherein the monomer comprises at least one of tetrahydrofurfuryl methacrylate, methacrylic acid, and methyl methacrylate.

13. The method of claim 1, wherein the reducing agent comprises a tertiary amine.

14. The method of claim 1, wherein the reducing agent is selected from N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

15. The method of claim 1, wherein the oxidizing agent comprises an organic peroxide.

16. The method of claim 1, further comprising an adhesion promoter.

17. The method of claim 16, wherein the adhesion promoter comprises a phosphorous containing adhesion promoter.

18. The method of claim 1, further comprising a toughener.

19. The method of claim 18, wherein the toughener comprises an olefinic-terminated liquid elastomer produced from a hydroxyl-terminated polyalkadiene.

20. The method of claim 18, wherein the toughener comprises an A-B-A block copolymer wherein the A block is selected from styrene, ring alkylated styrene or a mixture thereof and the B block is an elastomeric segment having a low T$_g$ selected from conjugated diene or ethylene-propylene.

21. The method of claim 1, wherein the epoxy compound comprises a polyepoxide.

22. The method of claim 1, wherein the epoxy compound is selected form a polyglycidyl ether of a polyhydric alcohol and a polyglycidyl ester of a polycarboxylic acid.

* * * * *